W. M. HOLLOWAY.
LISTING ADDER.
APPLICATION FILED APR. 1, 1916.
1,348,564.
Patented Aug. 3, 1920.
16 SHEETS—SHEET 10
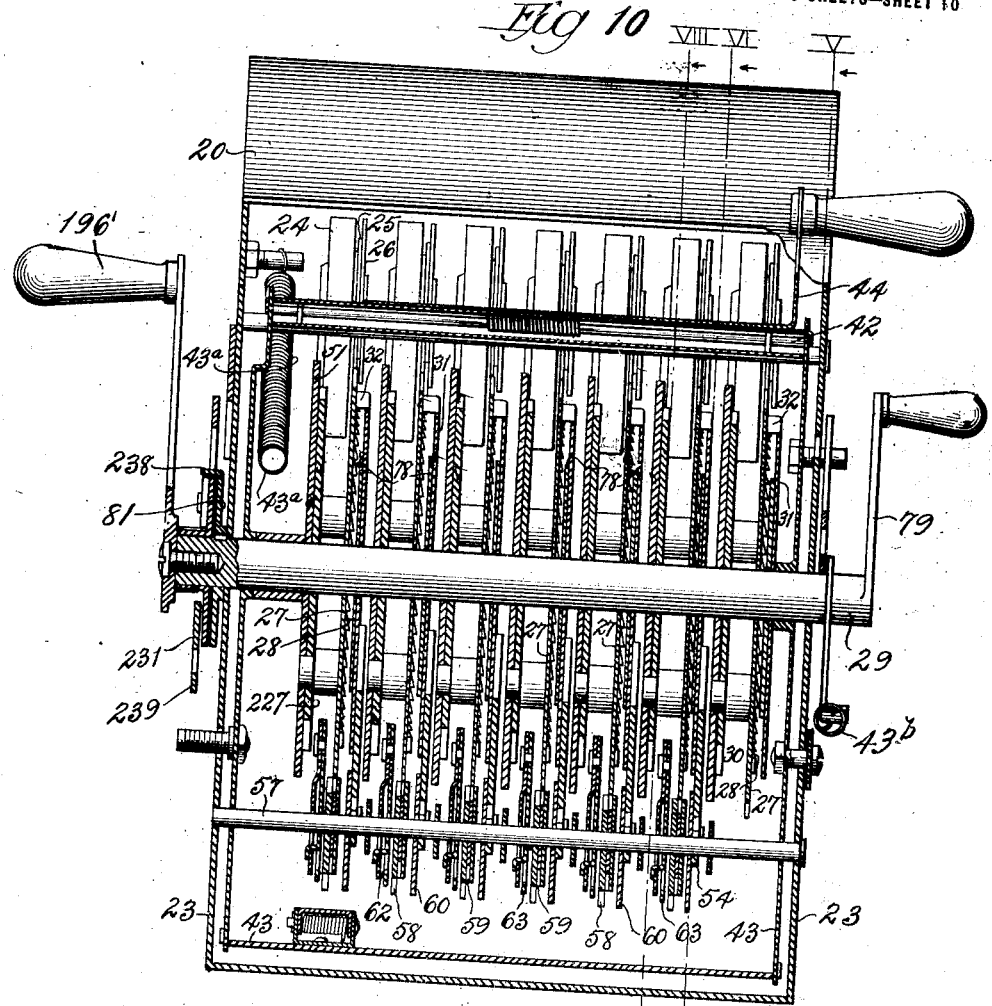
Fig. 10
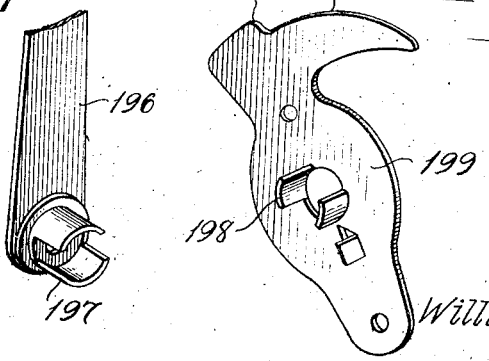
Fig. 11
Fig. 12
Witnesses:
Inventor
William M. Holloway
By Munday Evarts Adcock & Clark
Attys

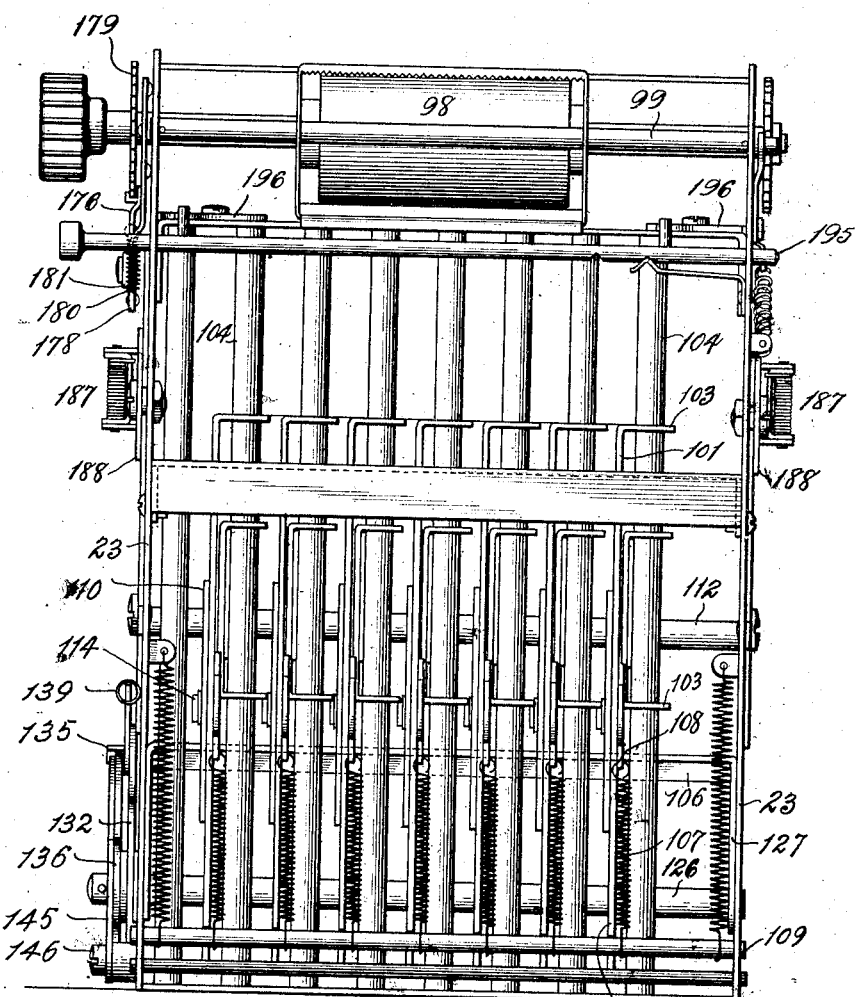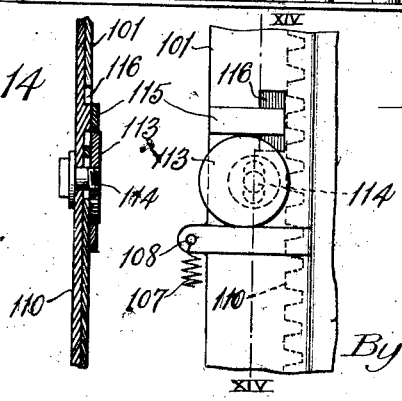

Fig. 16
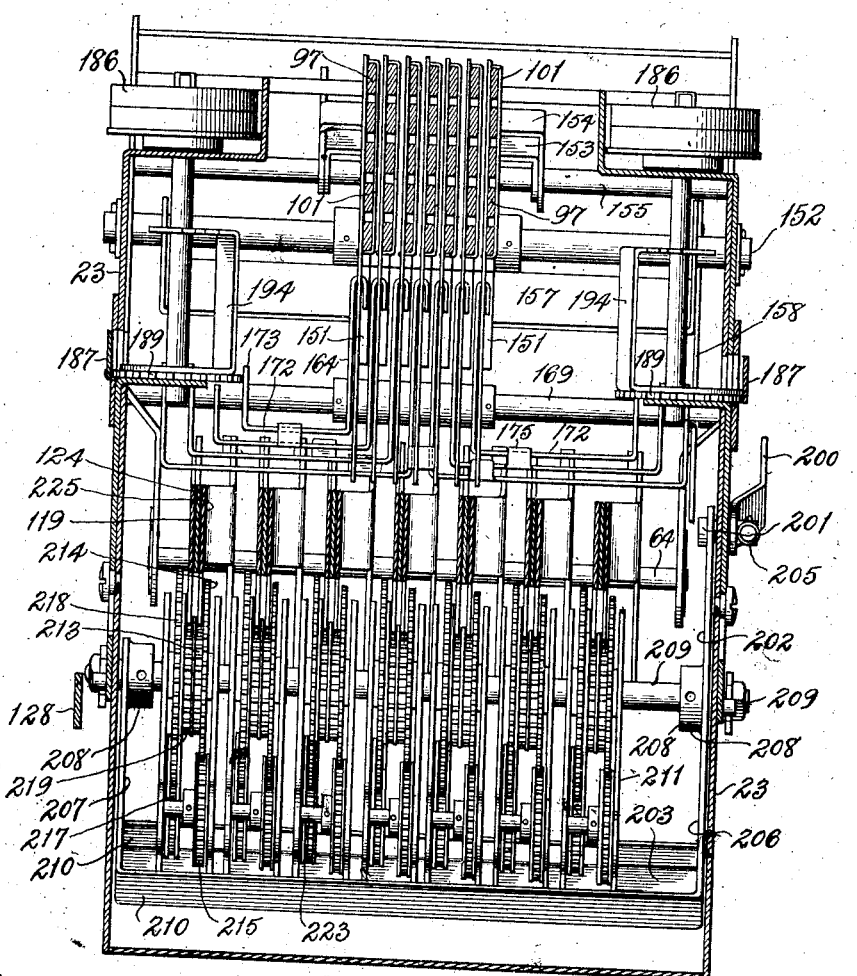
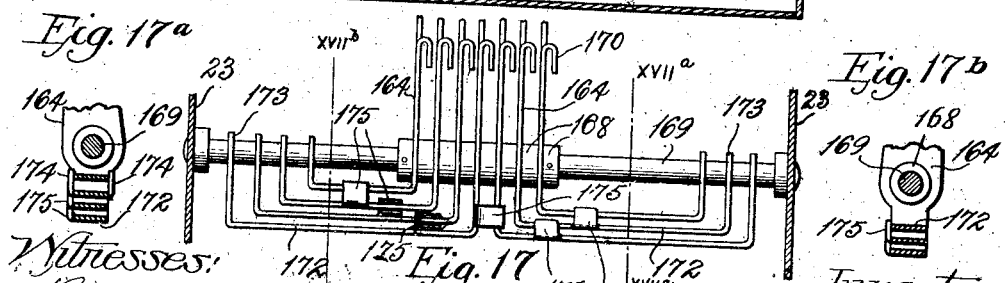
Inventor
William M. Holloway

W. M. HOLLOWAY.
LISTING ADDER.
APPLICATION FILED APR. 1, 1916.
1,348,564.
Patented Aug. 3, 1920.
16 SHEETS—SHEET 13.
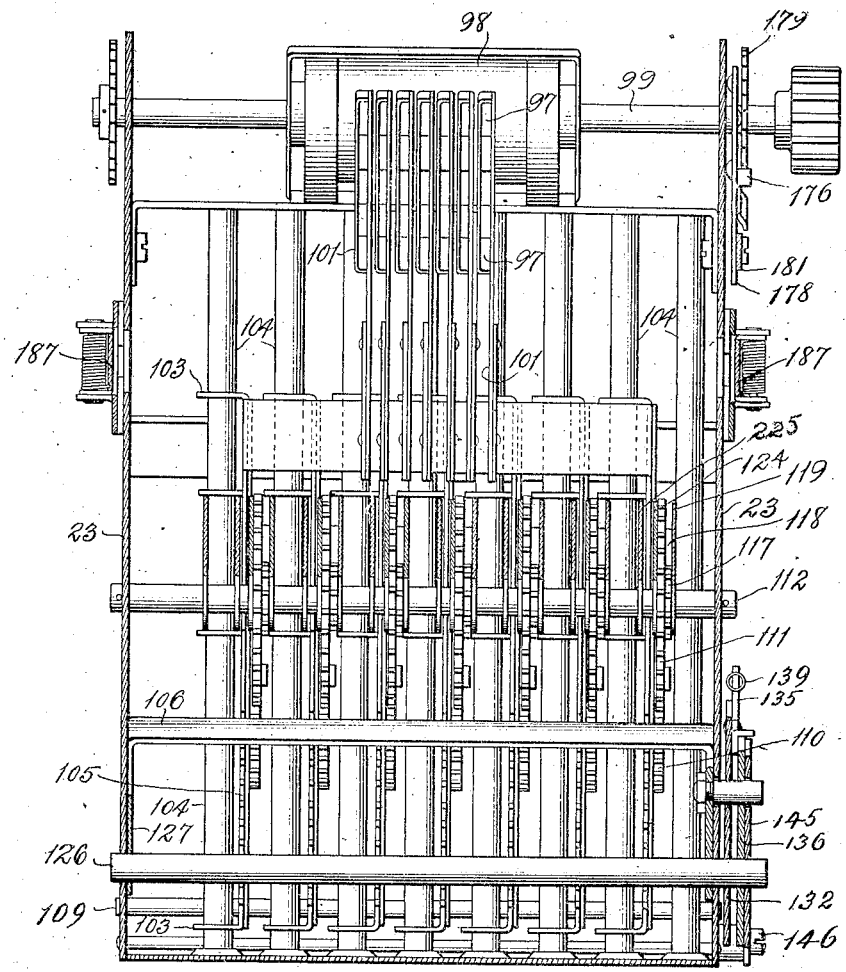
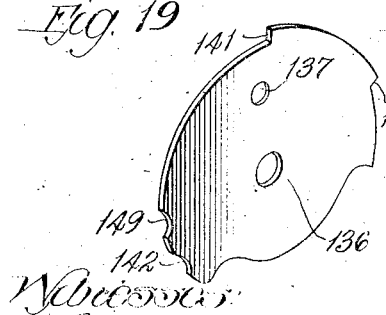
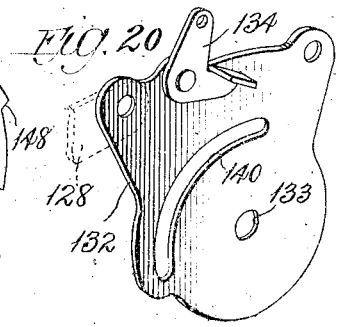
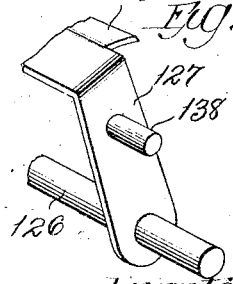
Inventor
William M. Holloway

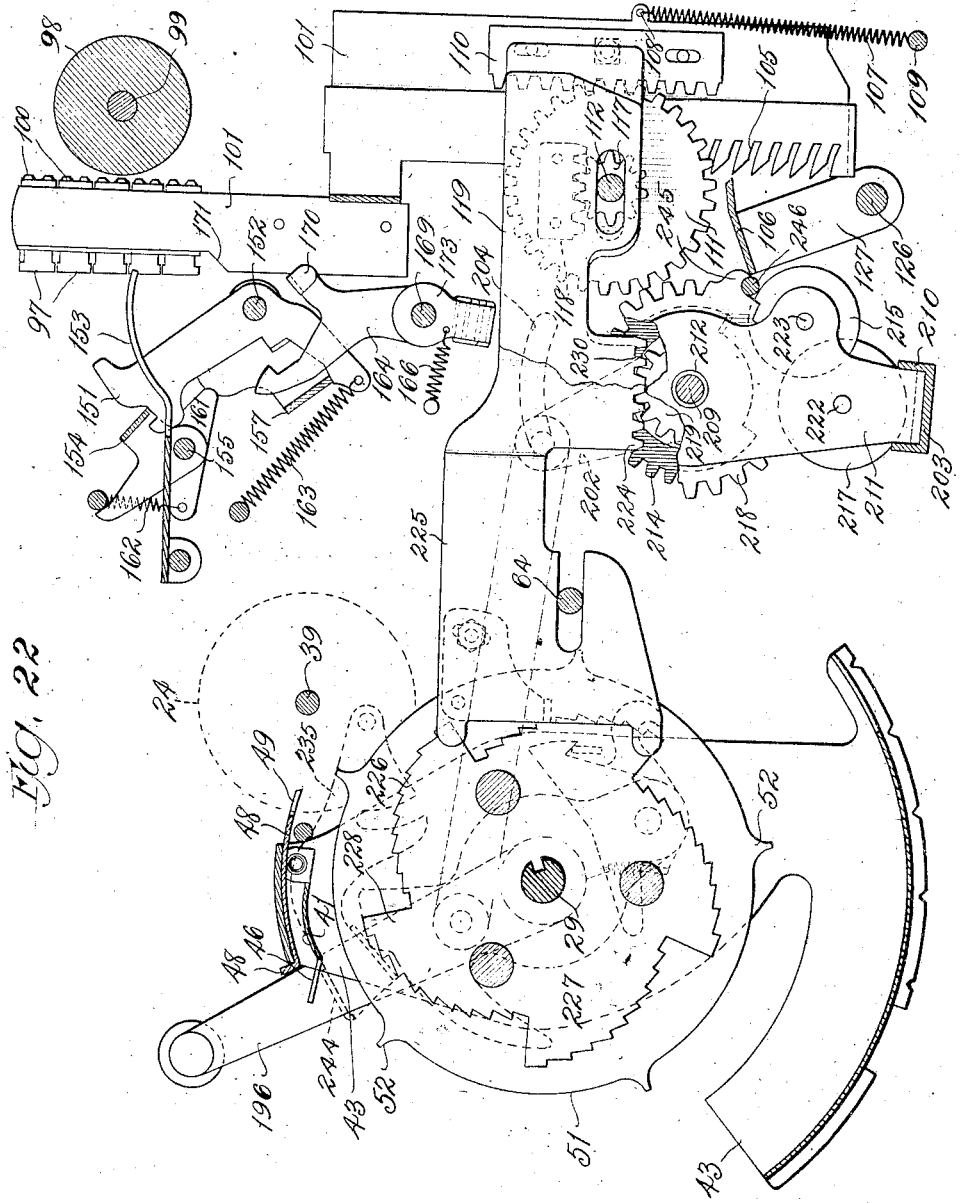

W. M. HOLLOWAY.
LISTING ADDER.
APPLICATION FILED APR. 1, 1916.
1,348,564.
Patented Aug. 3, 1920.
16 SHEETS—SHEET 15.
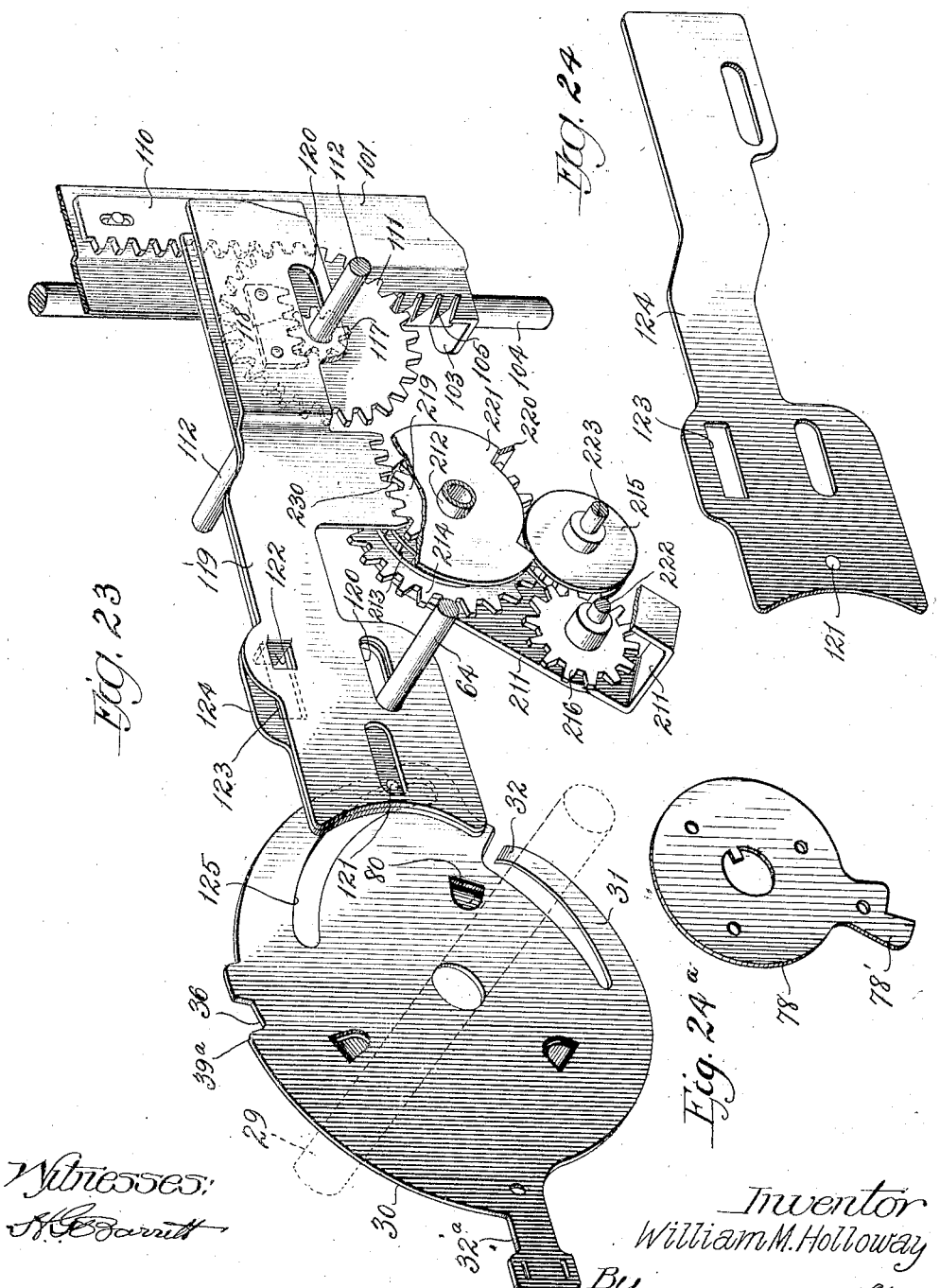
Witnesses:
Inventor
William M. Holloway
By
Munday Evarts Adcock & Clarke
Attys

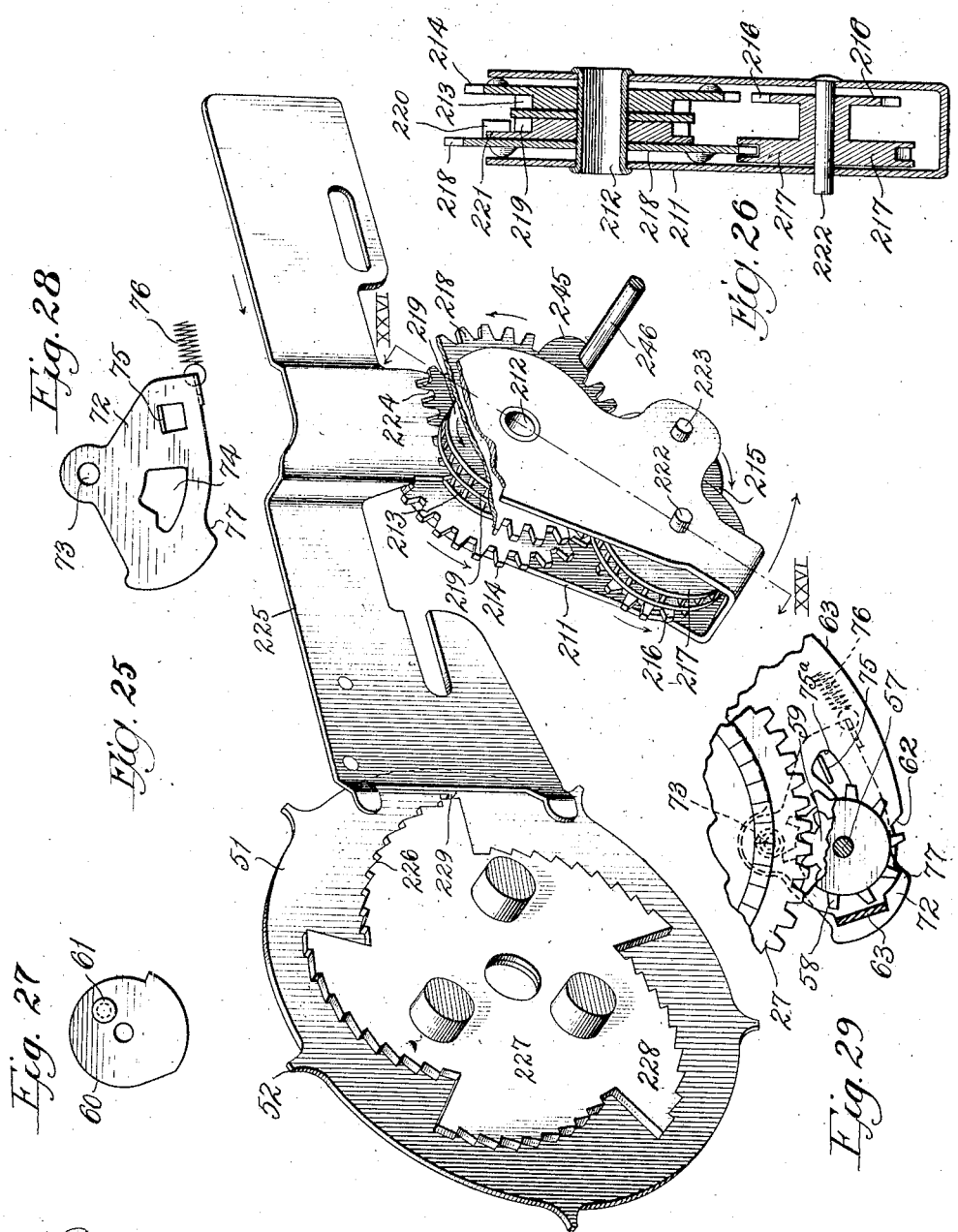

UNITED STATES PATENT OFFICE.

WILLIAM M. HOLLOWAY, OF MAYWOOD, ILLINOIS, ASSIGNOR TO AMERICAN CAN COMPANY, OF NEW YORK, N. Y., A CORPORATION OF NEW JERSEY.

LISTING-ADDER.

1,348,564.  Specification of Letters Patent.  Patented Aug. 3, 1920.

Application filed April 1, 1916. Serial No. 88,264.

*To all whom it may concern:*

Be it known that I, WILLIAM M. HOLLOWAY, a citizen of the United States, residing in Maywood, in the county of Cook and State of Illinois, have invented a new and useful Improvement in Listing-Adders, of which the following is a specification.

The invention relates to adding machines; and to such machines having means for printing or listing the amounts registered, and to means for totalizing or printing at any time the sum of the amounts registered; with a view of effecting economy in the construction of the machine and convenience, rapidity and accuracy in its use; and the invention consists in the parts and combinations thereof hereinafter set forth and claimed.

In order to make the invention more clearly understood I have shown in the accompanying drawings means for carrying it into practical effect, without limiting my improvements, in their useful applications, to the particular construction which, for the purpose of example, I have delineated. In the said drawings—

Fig. 10 is a vertical transverse section on line X—X of Fig. 2.

Figs. 11 and 12 are detail views in perspective showing the means of mounting and connecting the totalizing hand-lever.

Fig. 13 is a rear elevation with the back of the casing removed.

Fig. 14 is a vertical section on line XIV—XIV of Fig. 15.

Fig. 15 is a side view illustrating, in connection with Fig. 14, the means for adjusting the printing types relative to their setting mechanism.

Fig. 16 is a vertical transverse section, looking from the rear of the machine, on line XVI—XVI of Fig. 1.

Fig. 17 is a rear view showing parts of the hammer locking and releasing mechanism.

Figs. 17$^a$ and 17$^b$ are detail sectional views on lines XVII$^a$ and XVII$^b$, respectively of Fig. 17.

Figure 2:
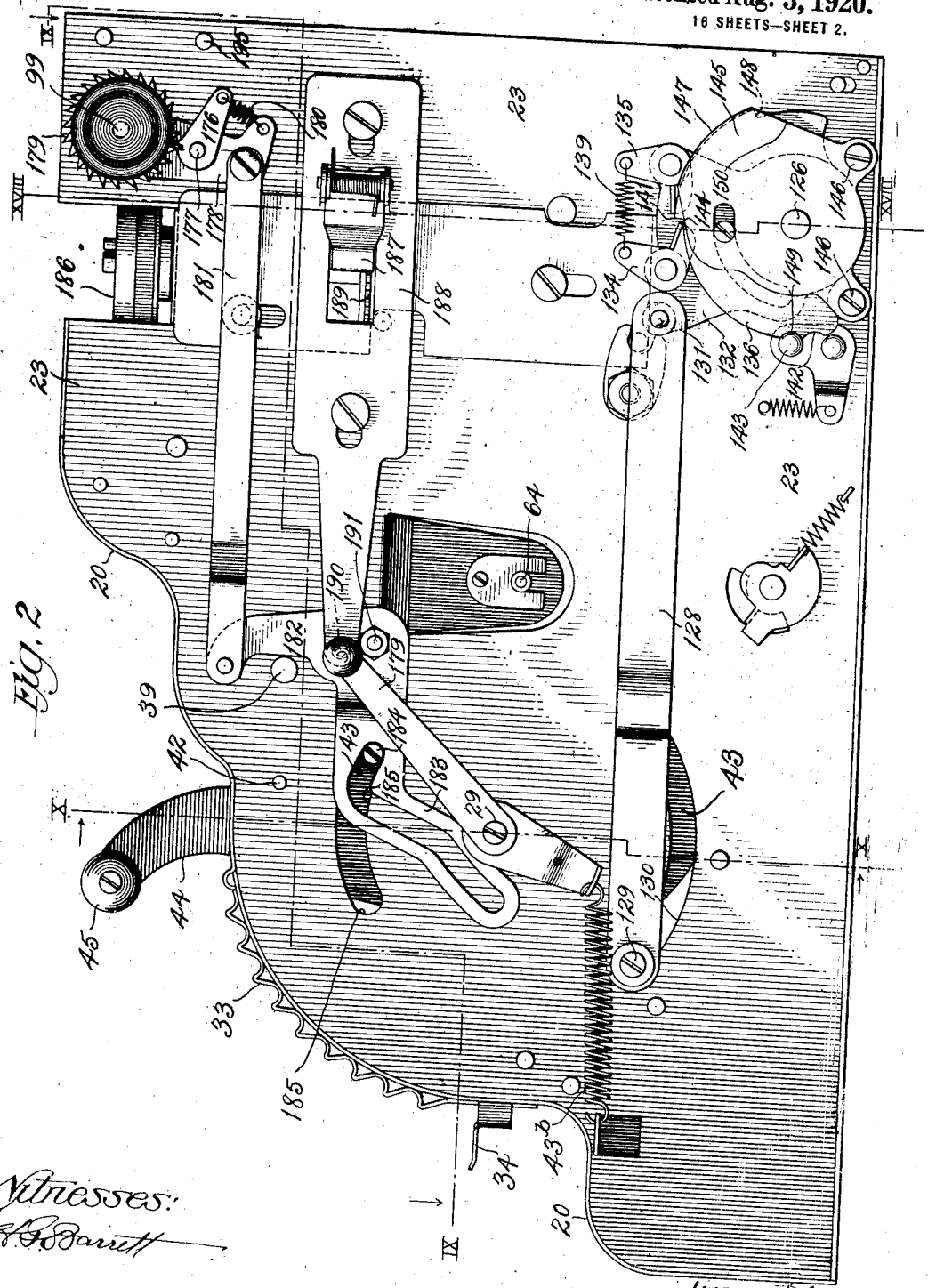
Fig. 2 is a side elevation of the same looking at the right-hand side of the machine.

Fig. 18 is a transverse vertical section, looking at the rear of the machine, on line XVIII—XVIII of Fig. 2.

Figs. 19, 20 and 21 are detail views in perspective, showing parts of the mechanism for alining and locking the vertically adjustable type bars.

Fig. 22 is a side view, partly in section, illustrating the totalizing mechanism.

Fig. 23 is a perspective view illustrating parts of the same mechanism.

Fig. 24 is a perspective view of the intermediate slide bar of said mechanism.

Fig. 24$^a$ is a perspective view of one of the releasing levers detached.

Fig. 25 is a perspective view of parts of the same mechanism showing more particularly the left-hand slide bar and the step cam.

Fig. 26 is a transverse sectional view on line XXVI—XXVI of Fig. 25.

Figs. 27, 28 and 29 are detail views illustrating portions of the transfer mechanism.

The machine illustrated comprises register or numeral wheels and mechanism for rotating them, arranged in several orders; means by which the mechanism of any order may be set for the rotation of its register wheel to the desired number; prime-actuating means for causing all of the mechanisms which have been so set to correspondingly rotate their register wheels; carrying mechanism or transfer devices for the register wheels; clearing or canceling means whereby the register wheels may be reset at zero; means for disconnecting the ordinal mechanisms from the actuating means; printing devices whereby any number registered is printed when it is added; totalizing mechanism by which the sum of the numbers which have been added or the total showing of the register wheels may be printed at any time; and means for cutting-out or eliminating from such totalizing any number which has been erroneously set up and ought not to be included in the registration or in the total.

The various parts of the mechanisms are mounted within a suitable casing or outer shell 20, and within the outer shell or casing is mounted a frame 23, adapted to support the several parts. In most of the figures the side and rear portions of the said casing, which I prefer to employ, have been omitted from the drawings to better display the mechanism. The machine illustrated comprises seven orders, although it will be understood that the number of orders may be increased or diminished, as desired, by duplicating or omitting parts of some of the mechanisms, and inasmuch as a great many of the elements employed in each order or column are identical, I shall only describe the parts necessary for one order or column except in so far as it may be necessary to describe elements which are common to all of the orders of the machine.

Figure 4:
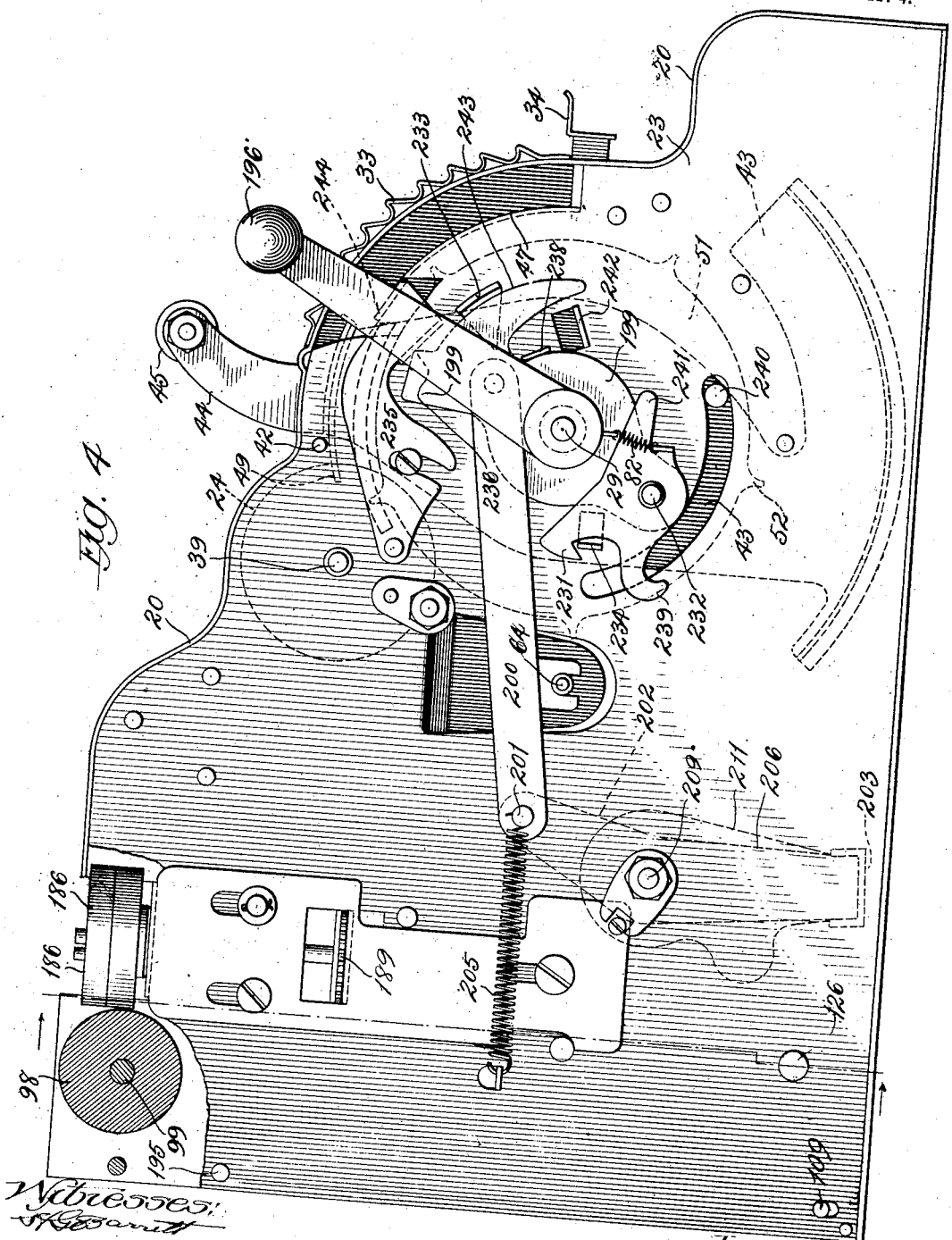
Fig. 4 is a similar view, showing the totalizing lever and connected parts in position for the totalizing operation.
Figure 5:
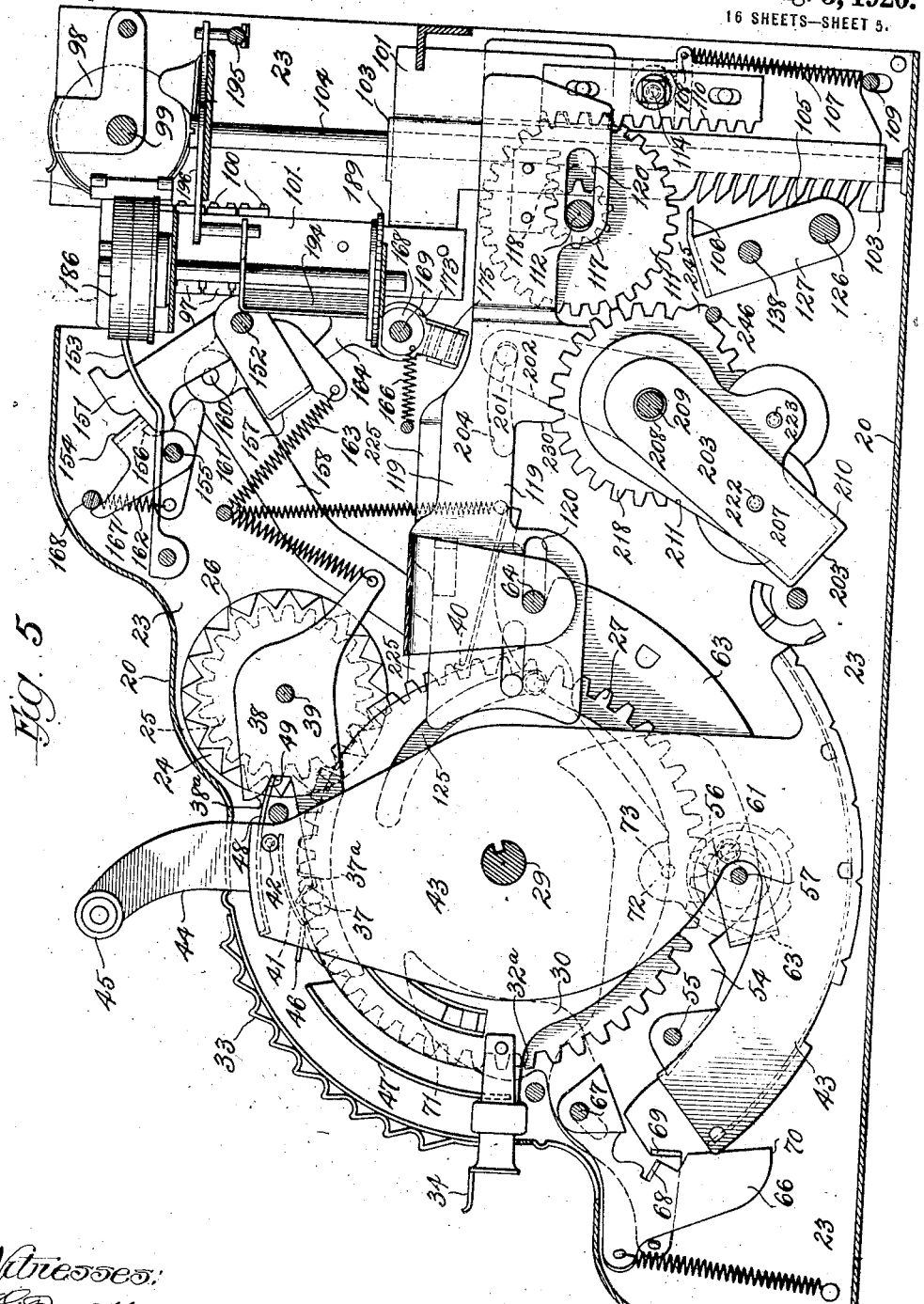
Fig. 5 is a vertical longitudinal section of the casing and supporting rods and shafts, on line V—V, of Fig. 10, showing the mechanism in elevation, looking at the right-hand side of the machine.
Figure 6:
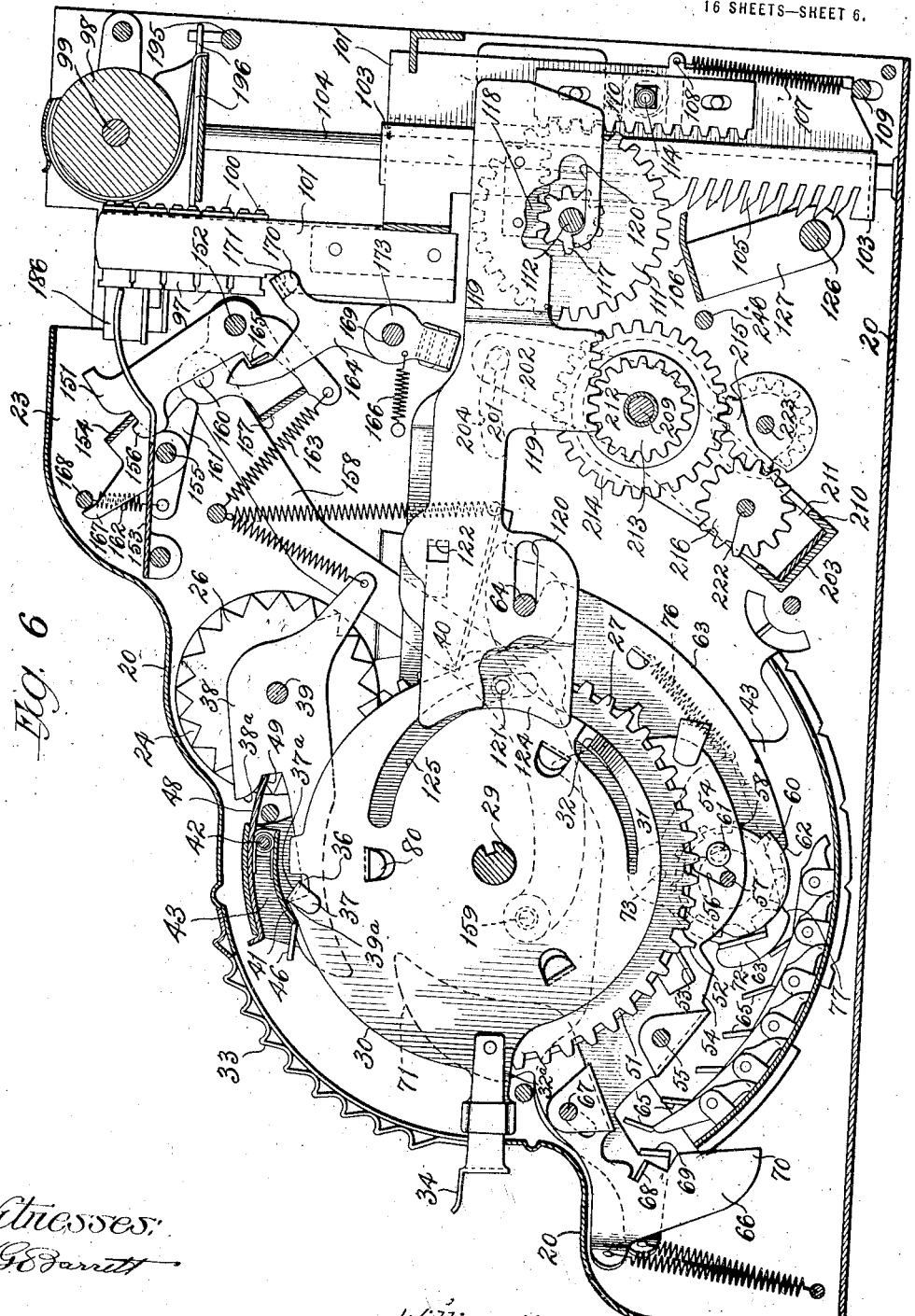
Fig. 6 is a similar view on line VI—VI of Fig. 10.
Figure 7:
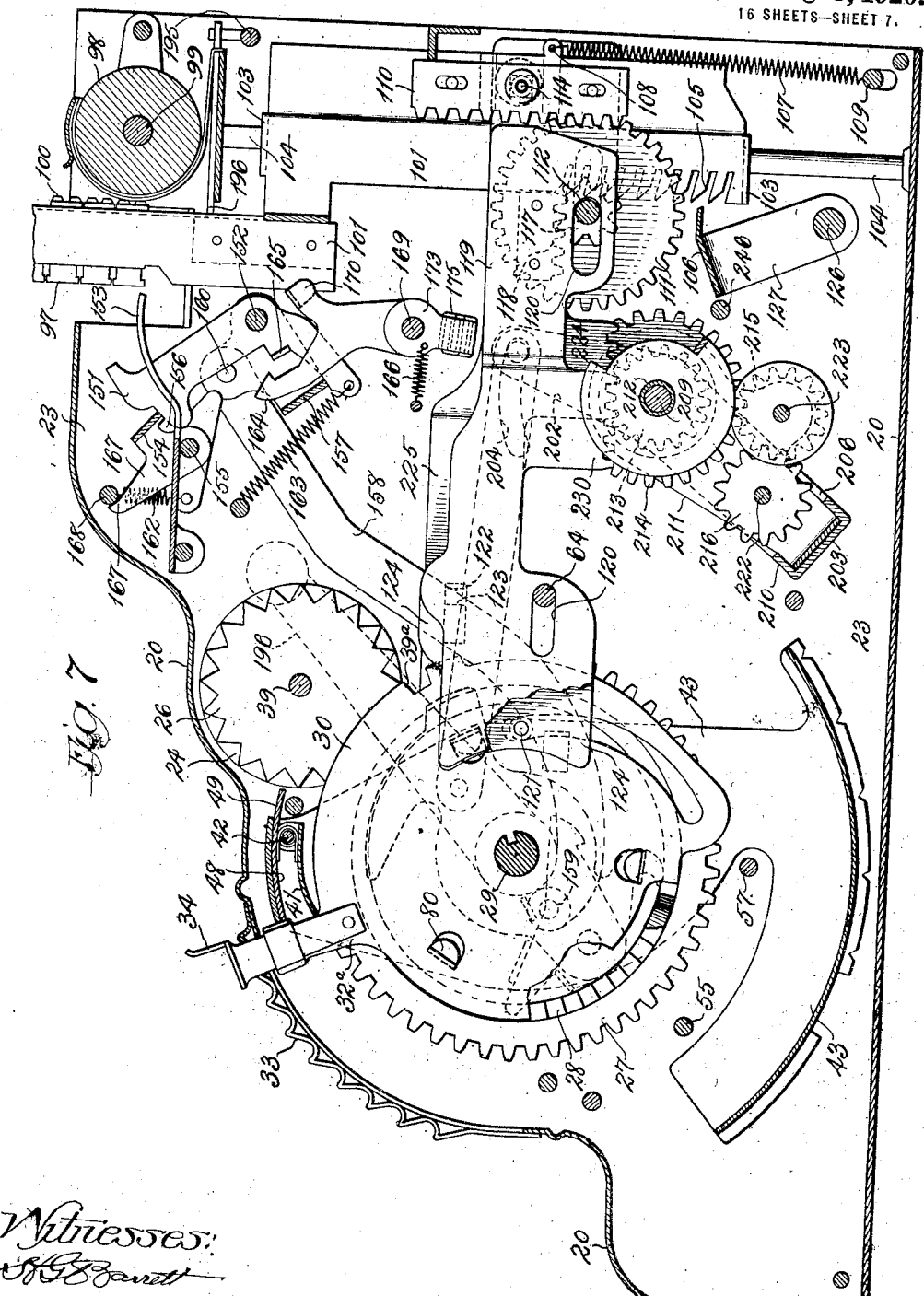
Fig. 7 is a similar view, showing the printing mechanism as having been partly actuated.

*Prime-actuating mechanism.*—Each order of the machine comprises a register or indicating wheel 24, having a gear 25 (Fig. 5) and a ratchet 26, the gear meshing with a major gear 27, which, as shown, is in the form of a disk, and has formed integral therewith a ratchet 28 (see Figs. 7 and 10), said gear 27 being rotatably mounted on a central, oscillatable shaft 29 extending transversely of the machine near the front of the same. Also rotatably mounted on the shaft 29 adjacent each major gear 27 is a set-up lever 30, which, as more clearly shown in Figs. 6 and 23, is in the form of a disk having one or more integral spring arms 31 each having a bent end 32, the latter being adapted to serve as a pawl and coöperating with the ratchet 28 to actuate the gear 27. The set-up lever 30 is provided with an arm 32ª which projects through the slot in the finger-board 33 in the outer shell or case 20, said arm 32ª having detachably secured thereto a finger-hold 34 contiguous with which the operator may see the numerals on the finger-board 33. This finger-board construction is fully described in the patent issued to Harbeck, No. 1036614 dated August 27, 1912. The disk of each set-up lever is provided with a notch 36 over which is normally positioned, when the set-up lever is at normal, an offset arm 37 (Fig. 6) having a cam or incline 37ª formed on the spring-controlled clearing bar pawl 38, pivotally mounted on the shaft 39, the latter serving also as the supporting shaft for the register wheels. The amount added in each order is determined by the extent to which the set-up lever is raised upwardly in the finger-board, and in lifting the set-up lever the pawl 32 thereof will ride over the ratchet 28, since the latter is prevented from backward rotation by means of a pivoted dog 40 (Figs. 5 and 6) that engages the gear 27, and which is mounted on a transverse fixed rod 64. When the set-up lever is raised the clearing bar pawl 38 will be lifted, owing to the cam face 37ª thereof being engaged by the corner 39ª of the set-up lever, and the pawl 38 will in turn lift the clearing bar 41. The latter is pivotally mounted on the rod 42 extending across all the orders of the machine and rigidly mounted in the combined prime-actuating, carrying, canceling, and printing yoke part or frame 43 (Fig. 5). The latter is preferably pivotally mounted on the shaft 29, and has an outwardly extended arm 44 to which is secured the operative handle 45. When the clearing bar 41 is thus raised, a projection 46 thereon will ride over the outside of a cam track 47 (Fig. 4) which prevents the clearing of the machine, as will be hereinafter described, this lifting of the clearing bar occurring by the raising of any set-up lever. When a set-up lever or levers have been set to the amount desired to be added, and the clearing bar thereby raised as hereinbefore described, the operator grasps the handle 45 and oscillates the upper part of the frame or yoke 43 forward and downward (the lower part of the yoke turning backward), whereupon the set-up levers will be engaged by the plate 48 which extends across all of the columns or orders of the machine, said plate 48 being rigidly secured to the frame or yoke 43. This returns all the set-up levers which may have been raised, to normal, the pawls 32 on the set-up levers in turn rotating the major gears 27, which in turn actuate the register wheels each for an amount corresponding to the distance for which its set-up lever has been raised. When the oscillatable yoke or frame 43 is returned to its normal or upright position, by hand or by means of the reciprocating spring 43ª, (Fig. 10) or spring 43ᵇ (Fig. 2), the plate 48, which is provided with a plurality of projections 49 on its rear edge, one for each order, will engage the ratchets 26 of the register wheels (Fig. 5) and center the same so that the numerals or other indicating marks will be properly alined with the apertures 50 in the casing (Fig. 1), through which apertures the amounts indicated on the register wheels are adapted to be read. Said projections 49 in coöperation with the clearing bar pawls 38 also serve another important function. As shown in Fig. 6, each clearing bar pawl has a cam face 38ª which is engaged by a projection 49 when the latter returns to normal, which causes the clearing bar pawl to be raised to neutral or normal position, as shown in said figure. When, however, the yoke 43 is moved from normal the clearing bar pawl in those orders of the machine which have not been lifted by movements of the set-up levers, will be allowed to have their offset arms 37 fall into the notches 36 of said set-up levers, thereby locking said set-up levers and preventing the same from being raised while the yoke or frame 43 is in any other position than normal.

Figure 8:
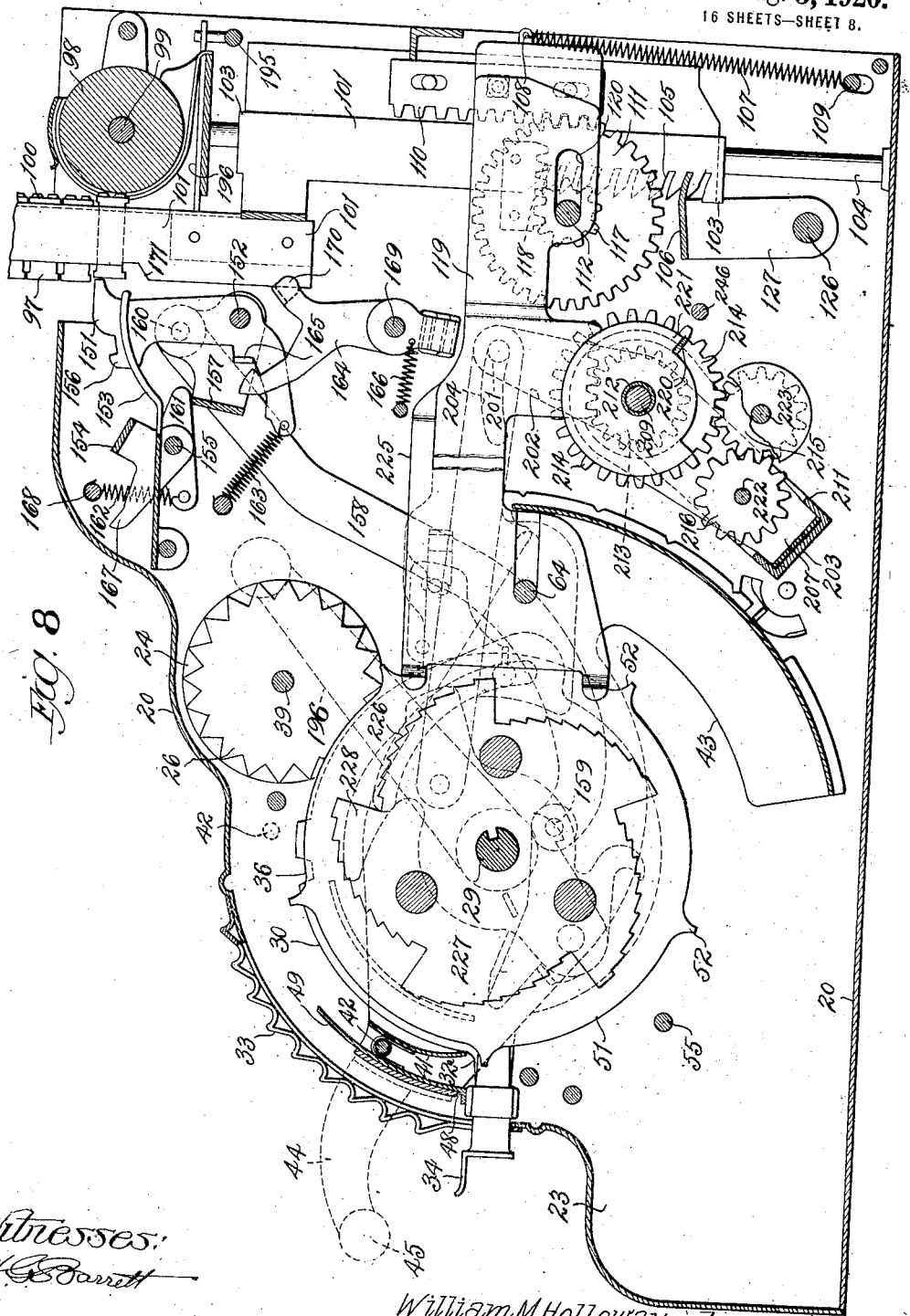
Fig. 8 is a similar view on line VIII—VIII of Fig. 10.

*Transfer or carrying devices.*—Referring now more particularly to Figs. 6 and 8 it will be seen that rigidly secured to each of the major gears 27 is a disk 51 (Fig. 25) provided with a plurality of projections 52, the number of said projections corresponding with the number of teeth on the major gear (in the sense that their number is a factor of the number of said teeth), there being in the case illustrated one of such projections for each ten teeth of the gear. As each gear 27 is rotated an amount corresponding to ten units, one of said projections 52 will engage the upper inner side of an offset 53 made integral with a spring-controlled gate-actuator 54. The latter is pivotally mounted on a transverse rod 55. The said gate-actuator 54 has provided therein a T-shaped slot 56 through one portion of which extends a transverse rod 57 on which are mounted the transfer wheels, each transfer wheel comprising a ratchet disk 58 and a gear 59 (Fig. 29), the latter engaging (Figs. 10 and 29) with a major gear 27 of the next succeeding higher order or column than that in which the gate-actuator disk is located. Also mounted on the shaft 57 and adjacent the transfer wheel is a gate 60 (Fig. 27) having a pin 61 which engages in another portion of said T-shaped slot 56. When the parts are at normal, the gate-actuator 54, transfer wheel and gate are in the position shown at the lower part of Fig. 6, but upon one of the projections 53 engaging the gate-actuator the parts are moved so as to cause the gate 60 to be oscillated on the shaft 57, said gate 60 when in normal position closing an opening or recess 62 formed in a bracket or guard 63 rigidly mounted on the shaft 57 and on the rod 64, and when the gate is in such closed position the spirally arranged, spring-controlled, pivoted carrying pawls 65, which are mounted on the lower part of the yoke 43, are prevented from engaging the teeth of their ratchets 58 when the yoke or frame is on its return stroke. When, however, the gate is opened or actuated, the pawl 65 will engage the ratchet 58 and rotate the same one-tenth of a revolution, which, as will be obvious, will rotate the major gear with which the transfer wheel engages, a corresponding amount. The gate and gate-actuators are of course operated during the down stroke of the yoke or frame 43, and the carrying or transferring is accomplished on the return stroke, and it becomes necessary to keep the gate open until the gear pawls 65 have had opportunity to operate the transfer wheels, and such means are provided in the spring-controlled, pivoted, gate-actuated, controller 66, the latter being supported on a transverse fixed rod 67. Said controller is provided with a projecting flange 68 which is adapted to catch beneath a coöperating, projecting flange 69 formed on the gate-actuator 54 when the latter has been operated by a projection 52, and adapted to hold the gate-actuator against the tension of its spring until after the transferring or carrying operation has taken place. Said controller may be released in one of two ways, either by the yoke or frame 43, which, on its return stroke, engages a depending projection 70 on the controller, or by means of the canceling or clearing bar 41, which is adapted to engage a cam face 71 also formed on the controller 66, the latter operation taking place during a canceling stroke only. In order to prevent overthrow of the transfer wheel during the carrying operation, a detent 72 (Fig. 28), yieldingly controlled by a spring 76 is provided, which is in the form of a disk pivotally mounted, as at 73, on the bracket 63, said detent being provided with a slot 74 for clearing the shaft 57, and having also a projecting lip 75 movable in a slot 75ª in the bracket 63 (Fig. 29) and which engages the ratchet 58 of the transfer wheel when said detent is moved against the tension of its spring by means of the coöperative carrying dog 65 that engages a cam face 77 thereon. The cam face 77 extends a little over the forward part of the opening 62 whereby the detent 72 will be held in engagement with the ratchet 58 for an appreciable time after the carrying dog 65 has passed by the opening 62 which will provide sufficient time for the shock on the transfer wheel to be dissipated, thus preventing overthrow of the transfer wheel, said cam face 77 operating finally to disengage the carrying pawl from the transfer devices as the return stroke of the yoke is continued.

*Clearing or canceling means.*—When all the sums desired have been accumulated on the register wheels, and no further additions are to be made, the set-up levers will of course all be at normal and the sum accumulated on the register wheels can be canceled by oscillating the yoke or frame 43. When all the set-up levers are at normal, all the clearing bar pawls 38 will be in their lowered or normal position which will allow the clearing bar 41 to ride with its projection 46 beneath the cam track 47, and as the clearing bar 41 is moved, it will engage or pick up the projections 52 on the disks 51, thereby rotating all of the disks and the gears connected therewith to a position where the register wheels will all indicate zero. When a printing or listening mechanism is combined with the adding mechanism, as hereinafter described, the total accumulation of the adding mechanism will ordinarily be printed before the clearing or canceling operation is performed.

Figure 9:
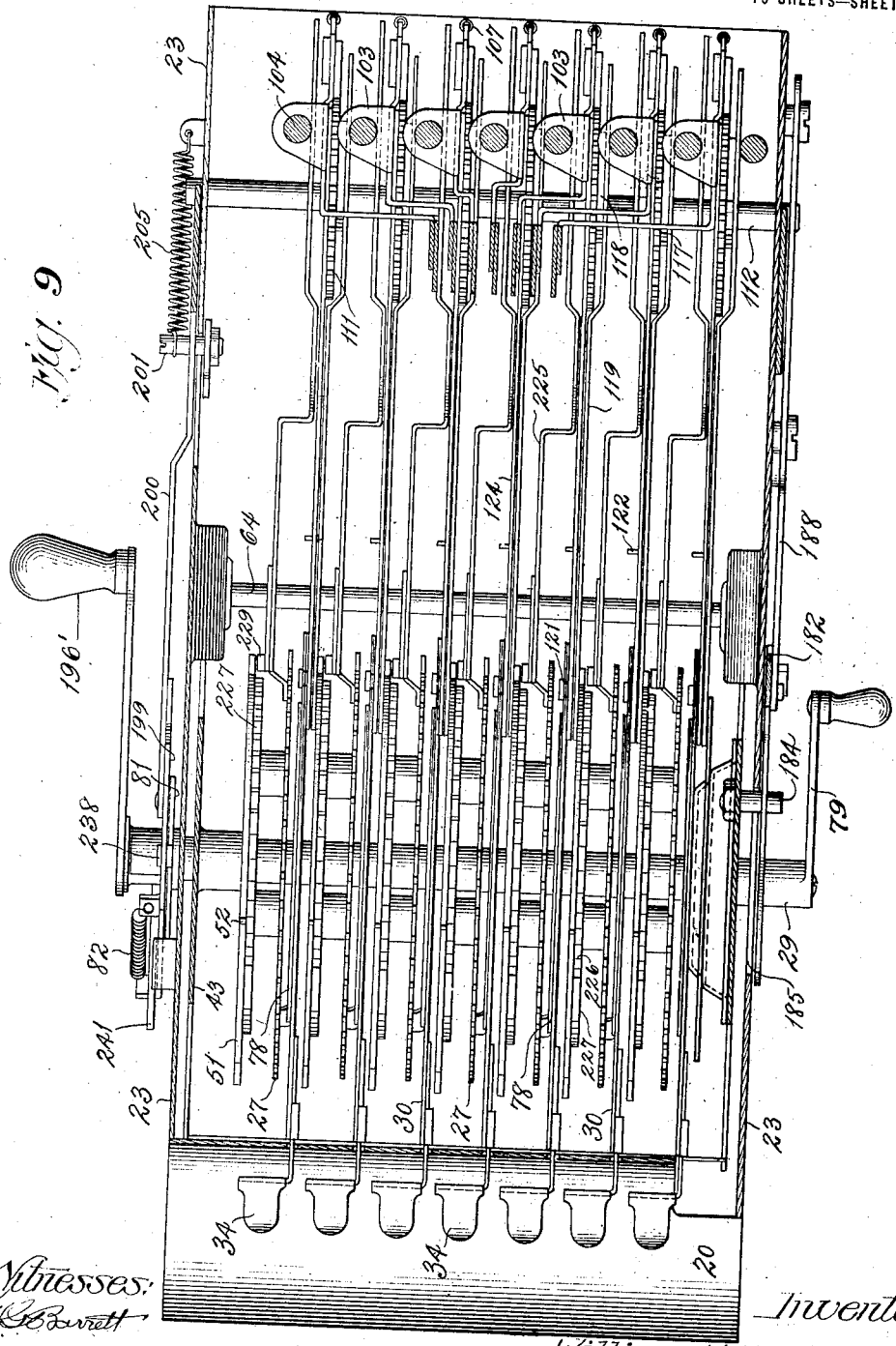
Fig. 9 is a plan view partly in section on line IX—IX of Fig. 2.

*Means for disconnecting the set-up levers from the prime-actuating mechanism.*—In practice, it is found that the operator occasionally makes an error in setting up the set-up levers, and it is desirable to correct such error without the necessity of canceling the amount which may be already accumulated on the register wheels, and I have provided such means in the following devices. Mounted between each set-up lever disk and major gear is a releasing lever 78 (Figs. 9 and 24ª) which is in the form of a disk keyed to the shaft 29, the latter extending to the outside of the casing, and having a crank arm 79 by which the shaft may be oscillated as desired. Each lever is extended at 78′ so as to come between the pawl or pawls 32 on the set-up lever 30 and the ratchet 28 so that when the lever 78 is rotated forward, its lower portion turning backward, the same will release the pawl or pawls from the ratchet. While the set-up lever is thus disconnected the extended part of the release lever engages a projection 80 formed on the set-up lever disk, whereby the latter is returned to normal without actuating the ratchet 28, and thereby the gear 27 is prevented from actuating its register wheel. The release levers 78 are normally held in their inoperative position by means of a disk 81 secured to the left-hand end of the shaft 29 (Fig. 3), said disk 81 having connected therewith a spring 82 arranged to press the upper part of the disk 81 rearward.

Referring again to the plate 48 and the projections 49 thereon, it will be seen that the latter, by engaging the ratchets 26, will lock the register wheels and prevent the same from being operated by attempted manipulations of the set-up levers independent of the oscillatable yoke.

Such being the construction and arrangement of the adding mechanism, which is or may be of the same construction and mode of operation as that set forth in my pending application, filed Oct. 25, 1912, Serial No. 727732, I will now proceed to describe the printing or listing, and totalizing mechanism and its connected parts, which are combined to coöperate with the said adding mechanism.

Figure 1:
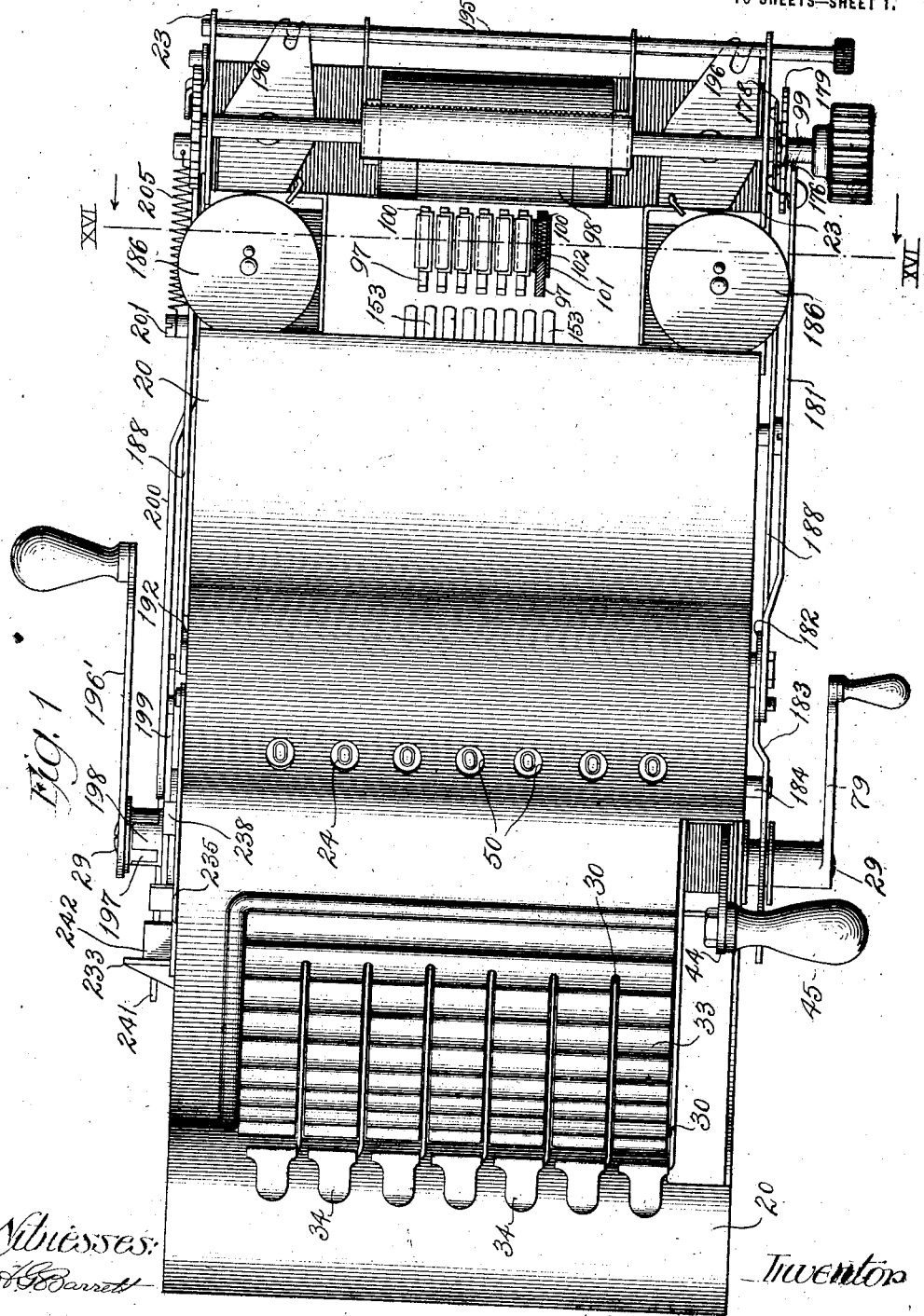
Figure 1 is a plan view of an adding and listing machine embodying the invention.

*The printing or listing mechanism.*—97 indicates the type bars arranged preferably at or near the upper or rear part of the machine, to be impressed against a sheet of paper fed around the inner side of the paper roll 98, this roll being mounted upon a shaft 99 carried in the frame 23. The type bars are formed on their rear faces with type 100 (Fig. 22) so arranged that the uppermost type will print 0, the next lower type will print 1, etc., the lowermost type printing 9. I find it convenient to arrange these 10 types on 5 type bars, 2 types on each bar, but they are so adjusted up and down by the operation of the adding mechanism (or of the totalizing mechanism) that only one type in each vertical row will print at once upon the paper. The type bars 97 are mounted in a type carrier 101 so as to be capable of having horizontal motion therein toward and from the platen roller 98, being advanced for printing by the blows of a suitable hammer, and being retracted to normal position by springs 102 (Fig. 1). Each type carrier 101 is or may be constructed of several parts connected to form a unitary whole, the lower portion of which extends down toward the base of the machine. 103 indicates bearings formed with or attached to the type carriers (Fig. 9) and arranged to slide vertically on guide rods 104, the latter being fixedly attached to the frame 23. At a suitable point, preferably near the lower end of the type carrier, the latter is provided with a comb or toothed rack 105 (Fig. 22), with which is adapted to engage a straight edge or wedge 106 (Fig. 21) for the purpose of accurately alining the types just before the printing impact of the hammers. The teeth which form the comb 105 are beveled on their forward faces to facilitate the entry of the said alining wedge. This wedge is caused to engage the type carriers for alining them, and is, after printing, removed from engagement, by suitable mechanism hereinafter referred to. The type carriers are constantly drawn downward by springs 107 (Fig. 13) connected with the carriers at 108 and attached to the frame 23 by means of a cross-rod 109 (Fig. 8). 110 indicates racks, one of which is attached to each type carrier and is engaged by a gear 111 mounted loosely on a fixed shaft 112. The rack 110 is made adjustable on the type carrier in order that the type carriers may be initially adjusted to a proper normal position relative to the operating gear 111, and to this end the type carriers may be vertically adjusted relative to the racks 110 by means of an eccentric 113 (Figs. 14 and 15), which eccentric is mounted by bearing pin or shaft 114 on the type carrier 101 and engages with a lug or shoulder 115 which is connected with the rack 110 through a slot 116 formed in the type carrier. A slight turning of this eccentric moves the type carrier vertically relative to the rack. 117 is a pinion attached to the gear 111 and meshing with a rack 118. This rack is horizontally movable and is attached to a horizontal sliding bar 119, which is guided by slots 120 fitting on the shaft 112 and on the fixed cross-rod 64. 122 is a lip or projection extending from the left-hand side of the slide 119 and engaging in a slot 123 formed in an intermediate slide 124, the latter being guided by suitable slots on the said cross parts 112 and 64. 121 is a pin fixed in the slide 124 and projecting from the left side thereof into a cam groove 125, the latter being formed in the disk of the set-up lever 30. When the set-up lever is turned upward and backward for the setting up of any digit to be added in any column, its slot 125 draws forward the pin 121 and through the mechanical connections above described rotates the gear-wheel 111 forward and elevates the corresponding type carrier, the shape of the cam slot 125 being such that when the set-up lever is raised sufficiently to indicate 5, and adds the sum to the register wheels, the type adapted to print 5 will be placed ready for printing opposite to the platen roller, and in a similar way the type for any number which is indicated by the set-up lever and accumulated upon the register wheels, will be adjusted ready for printing.

After all the digits composing a number, and which are to be printed in one horizontal line upon the paper, have been set up by the levers 30, the shaft 126, carrying the alining wedge 106 by arms 127, is rocked backward to cause the alining of all of the types for the said digits. 128 is a link (Fig. 2) connected with the yoke 43 by a pin 129 passing through a slot 130 in the right-hand frame plate. The rear end of this link is connected by a pin 131 with a rocker arm 132 (Fig. 20), the latter being formed with a central opening 133 which fits as a bearing upon the shaft 126 (Figs. 2, 19, 20 and 21). 134 and 135 are pawls adapted to act respectively backward and forward upon the rim of a ratchet member 136, this member being mounted to turn upon the shaft 126 and being provided with a hole 137 which fits around a pin 138, the latter being fixed in one of the arms 127 which support the alining wedge 106. The said pawls are mounted upon the rocker arm 132 and their operative arms are held in contact with the ratchet member by means of a spring 139. 140 is a slot in the rocker arm through which the pin 138 may extend to engage with the ratchet. When the main yoke 43 of the adding mechanism has its upper end thrown forward and its rear end thrown backward, in the adding operation, the link 128 is thrust backward, turning the rocker arm 132 and causing pawl 134 to engage a tooth 141 on the ratchet member and turn the latter backward, thereby causing the alining wedge 106 to enter the combs 105 of all of the type carriers and perform its alining function. When this movement of the ratchet member has taken place a notch 142 therein will engage with a spring-controlled pin 143 so that the parts will be frictionally held in the last described position. At this time the pawl 134 is thrown out of engagement with the tooth 141 by means of an inclined surface 144 which is formed upon a bracket plate 145, the latter serving to inclose the movable parts and being fixed to the frame 23 by means of screws 146. The link 128 and the rocker arm 132 are thus left free to continue in necessary backward movement while the yoke 43 is completing its full registering movement, the pawls 134 and 135 riding upon the outer face of a flange 147 which extends inwardly from the bracket 145. At the conclusion of the full movement of the main yoke the pawl 135 will drop off from the flange 147 and will be free to move forward as the yoke 43 is returned to normal position. When it so returns it will engage a tooth 148 on the ratchet member and return the latter to normal position, thereby disengaging the alining wedge from the type carrier and leaving the latter all free to be set up again according to the requirements of some new number to be added on the machine. When the ratchet member has been returned to normal position it will be frictionally held by the engagement of its notch 149 with the said spring-controlled pin 143. When the ratchet has reached its normal position the pawl 135 will be thrown out of engagement with the tooth 148 by means of an inclined surface 150 formed on the edge of the bracket plate 145. It will be understood that the printing impact of the hammers takes place before this return to normal position and while the wedge 106 is engaged with the combs of the type carriers.

151 indicates the printing hammers, arranged in a transverse series across the machine, one for each column or order in which printing is to be performed. The hammers are pivotally mounted to turn upon a fixed cross shaft 152, and their impact ends or surfaces are arranged at the front side of the type bars about opposite to the middle of the platen roller. 153 is a fixed guide-plate in the rearwardly extending slots of which, or between the fingers of which, the hammers 151 operate. 154 is the main hammer locking and releasing device consisting of a transverse bar pivotally connected by suitable arms with a fixed pivot rod 155 and adapted to engage behind projections 156 with which the hammers are provided. The forward movement of the lock 154 is limited by an arm 167 which engages a fixed rod 168. 157 is the printing trip consisting of a transverse bar connected by suitable arms with the fixed pivot rod 152 so as to swing upward and downward thereon. This trip is controlled by a link 158 which is pivoted to the main yoke 43 at 159 and is pivoted to the said trip at 160. The trip 157 engages beneath an arm 161 (Fig. 8) attached to the rod 155 and controlled by a spring 162 attached to its forward end, whereby the lock 154 is pressed forward and downward and the arm 161 is held against the trip 157. When the yoke 43 has completed its actuation of the set-up levers the link 158 will have lifted the trip 157 sufficiently to throw back the lock 154 far enough to release all of the printing hammers, at which time the hammers are caused to make their printing impact by springs 163 attached to their lower ends. The printing types are normally in position to print zeros, but I provide a supplemental lock for the hammers which will prevent the printing of zeros to the left of any number which does not extend into all of the left-hand or higher orders of the adding mechanism, which supplemental lock acts upon all of the hammers in orders in which printing is not to be done. 164 indicates hooks, arranged in a transverse series, one for each hammer, and adapted to engage with a transverse projection 165 on the hammer. These hooks are normally pressed toward engaging position by means of springs 166. Each of the hooks 164 is mounted to turn on a fixed cross rod 169 (Fig. 17) between spacers 168, the end spacers being pinned on the shaft. Each of said hooks is provided with a guide or loop 170 within which moves vertically a type carrier 101, and which is pressed against the type carrier by the spring 166. 171 is a cam on the type carrier normally engaging just below the guide 170 (Fig. 6). When any type carrier is moved upward for printing the cam 171 causes the hook 164 to release the hammer of that type carrier and such hammer is thereafter held only by its main lock 154. All of the other hammers whose type carriers have not been elevated (with exceptions to be mentioned) remain supplementally locked by their hooks 164. In printing tens and units, however, ordinarily representing cents, it is desired to print a zero at the right of the tens and a zero at the left of the units (if there be no digit in those places); and also to print zeros at the right of digits in the higher orders when the places at the right are not occupied by digits; which I effect by the following means: Each hook 164 is formed with a yoke 172 the outer end of which is pivotally hung at 173 on the rod 169. These yokes are preferably arranged in a right and left series (Fig. 17), the hooks of each series being nested one within another. 174 indicates a pair of lips attached to the tens yoke and engaging the front and rear sides of the units yoke, so that when either the units or tens type carrier releases its hook 164 the hook of the other order (tens or units) will also be released. 175 indicates a series of lips each attached to one of the yokes 172 and engaging the neighboring yoke in such manner the backward swinging of any yoke is accompanied by the backward swinging of every yoke in a lower order, so that the printing of a digit in a higher order will be accompanied by the printing of a zero in each lower order unoccupied by a digit. But the arrangement and engagement of the lips 175 is such that the backward swinging of any yoke does not affect any yoke of a higher order.

Each printing operation is followed by a one-line feed of the paper printed on, which is accomplished by a pawl 176 (Figs. 1 and 2) pivoted at 177 on an arm 178 hung on the shaft 99 of the paper roll. This pawl gives a step motion to the paper roll by a ratchet 179 attached to the shaft 99 and engaged by the pawl. The pawl is held to the ratchet by a spring 180, and the arm 178 is rocked by a link 181 connected with an angle lever 182. The angle lever is rocked by its cam-slotted arm 183, engaged by a pin 184 fixed to the main yoke 43 and extending through a slot 185 in the frame. When the lower part of the yoke swings backward in printing the pawl swings back to take a new tooth, and as the yoke returns after printing the pawl turns the front face of the platen roll and the paper thereon upward for the space of one line.

Figure 3:
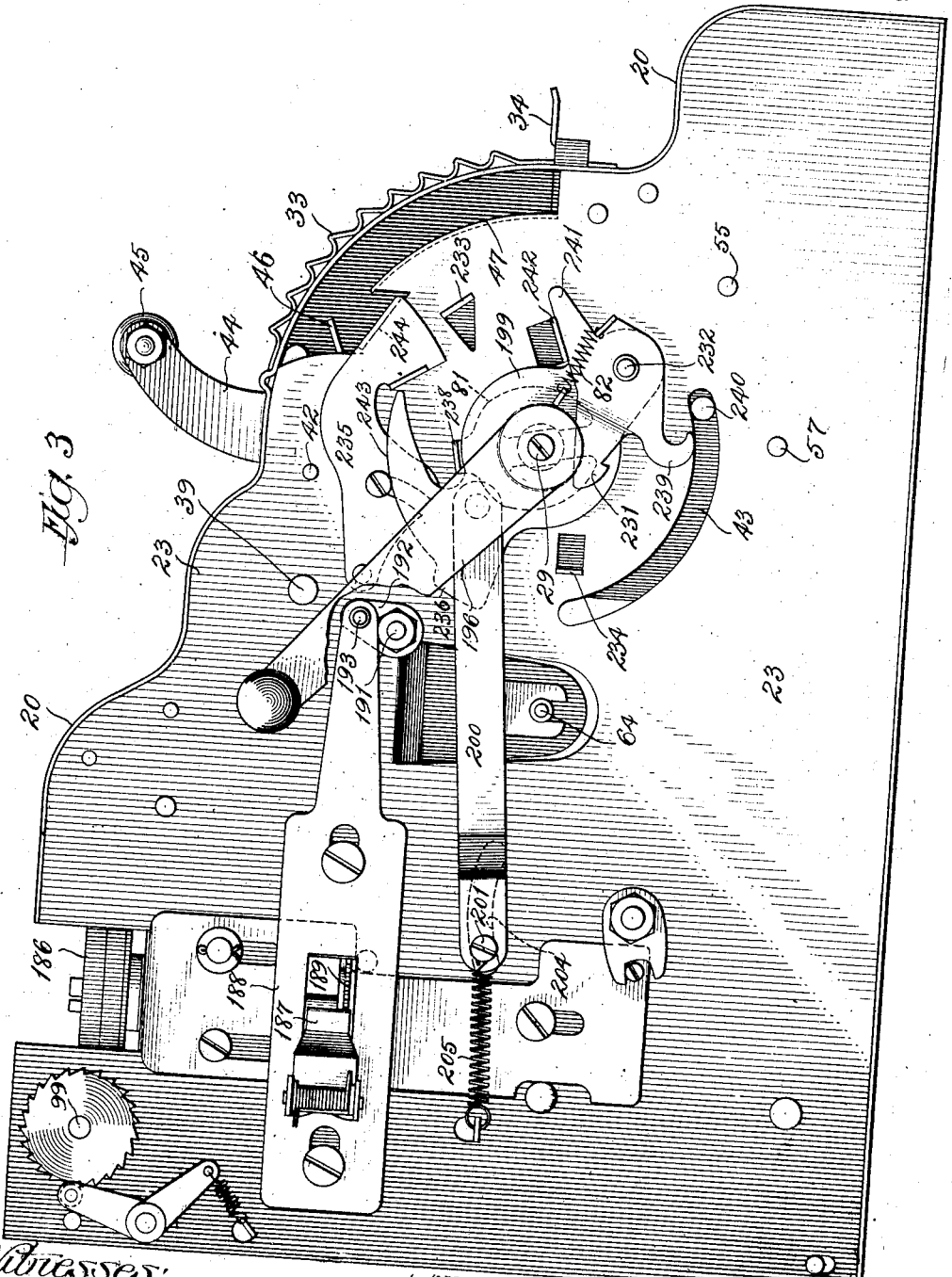
Fig. 3 is a side elevation looking at the left-hand side of the machine.

An ink ribbon of two colors is preferably employed, say the upper half black and the lower half red, the lower half being used in printing totals. This ribbon extends across the machine between the type and the platen, being fed to and fro by step-by-step rotating spools 186. This feeding is accomplished by pawls 187 pivoted on vertical axes on horizontal slides 188 and engaging ratchets 189 on the spool-shafts (Figs. 2 and 16). The front end of the slide 188 on the right side of the machine is connected by a pin 190 with the angle lever 182. The cross shaft 191 which forms the axis of this lever turns with the lever, and its other end is connected with the left-hand slide 188 by an arm 192 and pin 193 (Fig. 3). The ribbon is thus fed a step at each oscillation of the yoke 43. Each ratchet 189 and pawl 187 is provided with a yoke 194 (Fig. 16) pivoted on the spool shaft. These yokes are swung simultaneously in horizontal planes to throw out one pawl 187 and to allow the other pawl to operate. In Fig. 16 the pawl at the right is thrown out by its yoke 194 and the pawl at the left is allowed to engage and operate its ratchet 189.

This arrangement is reversed by a shift rod 195 (Fig. 1) which operates horizontal shift levers 196, each of the latter being connected with one of the yokes 194. The adjustment of the yokes 194 and pawls 187 may thus be reversed as required to cause the ribbon to be wound on either of the spools 186.

*The totalizing mechanism.*—The register wheels of course show at any time the total which has been accumulated by the adding mechanism, and means are provided for printing at any time this total, at the foot of the printed list of individual additions. To this end the position of the register wheel, of any order and mechanism geared therewith on the shaft 29, is caused to control the position which the type carrier of that order will assume in the total-printing operation, so that the same figure as is shown by the register wheel will be printed. 196' is the totalizing lever or handle mounted to turn freely on the left end of the shaft 29. It is provided with a notched hub 197 adapted to interlock with the correspondingly notched hub 198 of a lever and cam arm 199 (Figs. 1, 3, 4, 11 and 12) so that these parts turn together from the normal position shown in Fig. 3 to that shown in Figs. 4 and 22, during and at which movement the total-printing is performed. 200 is a link pivoted to the arm 199 and connected by a pin 201 with the arm 202 of a differential yoke 203 within the casing (Figs. 5, 6, 7, 8, 16, 22–26), the said pin passing through a slot 204 (Fig. 8). 205 is a spring which draws the said parts rearward and maintains them normally in the position indicated in Fig. 3, the yoke 203 assuming the forward position shown in Fig. 5. The said yoke has mounted therein independent sets of what may be termed differential gears, one set for each order of the adding mechanism, the operation of one of which sets of gears to properly position the type carrier of that order so that it will print a digit corresponding with the showing of the register wheel of that order, will now be described. The yoke 203 comprises two side arms 206, 207, with the former of which the arm 202 is integral. These arms are provided with bearings 208 by which the yoke is hung on a cross rod 209 mounted in the frame 23. The lower cross member of the yoke is provided with upwardly extending flanges 210 between which are confined the lower ends of narrow individual yokes 211, the upper ends of the latter yokes being provided with tubular journals 212 (Fig. 26) on which the three upper gears of the differential gearings are mounted to turn, and through which passes the yoke-supporting rod 209. Each yoke 211 contains the differential gears belonging to one adding order, as shown in Figs. 25 and 26. When the yoke 203 is caused by the totalizing handle 196 to move rearward it carries with it, turning about and below the rod 209, all of the yokes 211. The upper side of the gear 213 is thus caused to turn forward, as if it were a fixed part of the yoke 211, it being held from rotation on its journal 212 by the meshing and connected train of gears 214, 215, 216, 217, 218 and 219, which present a frictional obstacle to the rotation of the gear 213 in and relative to the yoke 211. The gears 213 and 214 are integral (Fig. 26) and are mounted to turn on the journal 212; the gears 218 and 219 are mounted to turn on this same journal, and in the forward direction of rotation they engage and turn together by the projection 220 on the gear 218 and shoulder 221 on the gear 219 (Fig. 8); the gears 216 and 217 are integral and are mounted in the lower part of the yoke 211 on a pin 222 so that the gear 217 meshes with the gear 218; and the gear 215 is mounted on the pin 223 and meshes as an idler with both of the gears 214 and 216. The gear 213 therefore performs the work of least resistance and, being engaged with the horizontal rack 224 on the left-hand slide 225, it thrusts said slide forward. The latter is supported and guided by slots which inclose the rod 64 and shaft 112, and slides forward until it encounters a step 226 on the step cam 227 (Fig. 25). The step cam has five arms 228 (Figs. 8 and 25) and each of these arms has ten of the steps 226, each step representing a digit or zero. The step nearest to the center of the step-cam represents zero, the next step 1, etc., the step farthest from the center representing 9. The step-cam 227 is fixed to the major gear 27 of its order and consequently turns in correspondence with the register wheel gear 25, and when the register wheel presents for instance "5" the step-cam presents a step 226 representing "5" to the stop projection 229 with which the slide 225 is armed (Fig. 25). As soon as the forward movement of this slide is arrested by the contact of the projection 229 against the step 226, the differential gear starts into operation to raise the type carrier 101 to such height that the "5" type (in the case supposed) will be brought into printing position. If a "9" step 226, which is the highest step, should arrest the slide 225, then the differential gear would sooner start into operation, the type carrier would be raised higher, and the "9" type would be brought into printing position. When the gear 213 can no longer advance the arrested slide 225, but the yoke 211 continues turning backward relative to the gear, the same effect is produced in the differential gearing as if the gear 213 were rotating backward in its yoke. Consequently the gear 214 turns backward, the gear 215 turns forward, the gears 216 and 217 turn backward and the gear 218 turns forward. Thereupon the projection 220 on the latter gear encounters the shoulder 221 on the gear 219 and turns the latter forward. This advances the rack 230 with which the gear 219 meshes, and advances the right-hand slide bar 119 which is formed with the said rack 230, and which also carries the rack 118 (Fig. 23). In this movement the lip 122 advances in the slot 123 irrespective of the intermediate slide bar 124. The said advance of the rack 118 is accompanied by a forward rotation of pinion 117 and gear 111 and an elevation of the type carrier 101 of the adding and printing order under consideration. These last movements are of the same nature as those already mentioned in the description of the printing of individual additions. The parts are so proportioned and adjusted and the advance of the slide bar 119 is for such distance, depending on the distance of the arresting step 226 from the center at 29, that the desired type, corresponding with the said step and with the showing of the register or numeral wheel of the order, will be brought into printing position. The type carriers of all of the orders in which printing is to be done are actuated as above described, substantially simultaneously, though the types which are to print larger numbers ordinarily move before and farther than the types which are to print smaller numbers, and all necessary zeros are caused to be printed by the means already described. After the type carriers are properly positioned the handle 45 and yoke 43 are actuated, which alines the carriers by the wedge 106 and causes the release of the printing hammers. On the subsequent forward movement of the link 158 the trip retracts the hammers by means of the trip 157, which is then caused to bear down on the tails of the hammers (Fig. 22), and they are locked in retracted position by the parts 154, 164, ready for another printing. 231 is a catch pivoted at 232 on the cam arm 199 (Figs. 3 and 4), and controlled by the spring 82, which, on the forward setting of the totalizing handle against a fixed stop 233, engages a fixed lug 234 on the frame, so that the said handle and parts connected therewith are held in place during the total-printing by the handle 45. 235 is a lifting lever arranged to lift the clearing bar 41 to ride on the track 47 when the machine is set for taking a total, the lever 235 in turn being lifted by the projection 236 of the arm 199. The disk 81 is keyed on the shaft 29 (Fig. 10) and has an outward projection 238 arranged in the path of the arm 199 (Fig. 4) whereby the said setting is accompanied by a forward rotation of the shaft 29, which causes the release levers 78 to cut out any erroneous setting of the main levers 30 which ought not to be included in the total the same as if actuated by the handle 79. 239 is a hook or arm on the catch 231 which hook is engaged by a pin 240, fixed on the yoke 43, at the end of the totalizing stroke of the yoke whereby the catch 231 is released at the completion of the total-printing stroke of the handle 45 and yoke 43, and the handles 196 and 45 return backward together to normal position, whereupon the forward tail 241 of the catch will engage under a fixed lug 242 (Fig. 3) to disconnect the hook 239 from the pin 240 and leave the yoke 43 free from the totalizing mechanism for the usual adding and printing of items. When the handle 196 begins to be pulled backward to be set, the cam 243 of the arm 199 lifts the inward projection 244 of the lever 235 into the path of the upper part of the yoke 43, so as to lock the yoke until the totalizing mechanism is full set, whereupon the projection 244 will be lifted higher, above the shoulder of the yoke, by the projection 236 to form in effect a continuation of the track 47 and allow the clearing bar to ride thereon.

On the return backward of the handles 45 and 196 the differential yokes 203 and 211 swing forward, the wedge 106 releases the type carriers, the type carriers descend and the slide bars 119, 124 and 225 return to their normal rearward position, the differential gearings at the same time returning to normal with movements the reverse of those already described. At near the end of these return movements hooks 245 on the gears 218 engage a fixed cross rod 246 (Figs. 5 and 25), which brings all of the gearings to rest in proper normal position for new totalizing movements. The type carrier retracting springs 107 coöperate in thus returning the said slide bars and other parts, as do the cam slots 125, spring 43ª and spring 205.

Although I have herein described and shown the construction which I now consider preferable, as embodying my improvements, yet it will be obvious to those skilled in the art, that various changes and modifications may be made in the different parts and combinations of parts without departing from the spirit of the invention, and all such changes and modifications are contemplated as come within the scope of the claims appended hereto.

I claim:

1. In a multiple-order calculating machine having registering mechanism, transferring devices and printing mechanism, a forwardly extending individually oscillatable key-lever in each order adjustable in vertical planes, an oscillatable means extending laterally across and common to all the orders of the machine, pivotally supported at each side of the series of said orders and engageable with all set key levers of said orders, for effecting the prime movements of the registering mechanism during one portion of its movements, connected with the printing mechanism for actuating the latter after the said prime movements of the registering mechanism have been effected, and arranged to actuate the transferring devices during another portion of its movements; substantially as specified.

2. In a multiple-order calculating machine having registering mechanism, a forwardly extending individually oscillatable key-lever in each order adjustable in vertical planes, transferring devices and printing mechanism, in combination: a movable yoke extending laterally across and common to all orders of the machine in front of the axis of said key-levers and above and engageable with the set key-lever of each of said orders for effecting the prime movements of the registering mechanism, and connected with and adapted to actuate the printing mechanism at the conclusion of said prime movements; substantially as specified.

3. In a multiple-order calculating machine having registering mechanism, a forwardly extending individually oscillatable key-lever in each order adjustable in vertical planes, transferring devices and a printing mechanism, in combination: a movable part extending laterally across and common to all the orders of the machine and arranged to engage the set key-lever of each of said orders for effecting the prime movements of the registering mechanism; connections between the printing mechanism and the said movable part whereby the printing mechanism is actuated at the conclusion of the registration; means whereby the said movable part is adapted to effect the operation of the transferring devices; and mechanism whereby the said movable part may be caused to effect the clearing of the machine, substantially as specified.

4. In a multiple-order calculating and listing machine, in combination: orders of adding mechanism each having a forwardly extending individually oscillatable actuating lever key; corresponding orders of printing mechanism; a paper-holding printing platen; an oscillatable part common to all the orders of the machine and extending across and engageable above all of said lever keys; and means whereby the said part is caused to effect the prime movements of said lever keys and the registering mechanism and to print a corresponding addition, and on another stroke to actuate the transfer devices; substantially as specified.

5. In a multiple-order calculating machine having registering mechanism, radially extending and individually oscillatable actuating lever keys for the same, transferring devices and printing mechanism, in combination: a movable part common to all orders of the machine and extending across and engageable above the said lever key of each of said orders, when said key has been elevated to desired set position, for depressing all set keys and effecting the prime movements of the registering mechanism; and means whereby the said movable part at one portion of its stroke positions the printing mechanism to correspond with the registration which itself effects, and then causes the actuation of the printing mechanism, substantially as specified.

6. In a multiple-order calculating machine having registering mechanism, transferring devices and printing mechanism, in combination: a series of key levers each individually oscillatable in vertical planes and connected with an order of said registering mechanism; a corresponding series of spaced finger holds arranged by said levers and serving as rests whereby the operator's finger may serve as a determinant stop in the manipulation of the levers; a movable part common to all orders of the machine and engageable with the said key levers for effecting the prime movements of the registering mechanism; and means whereby the said movable part is connected with and adapted to actuate the printing mechanism at the conclusion of said prime movements; substantially as specified.

7. In a multiple order calculating machine, the combination of orders of registering mechanism each having an actuating radial lever key adapted to be set by swinging the same upward to desired position, an eccentric oscillatable means common to and extending across all of the said orders and engageable at a stroke with said lever keys when they have been set and adapted to depress all set lever keys to normal position, corresponding orders of printing mechanism adapted to be actuated by said lever-keys as they are depressed, and connecting mechanism whereby said lever keys are respectively connected with and are adapted to set the said orders of printing mechanism.

8. The combination of orders of finger key levers, accumulating mechanism which may be set by said key levers, totalizing mechanism, printing mechanism including type carriers, and means for actuating the accumulating mechanism and the type carriers according to the setting of said key levers, said totalizing mechanism comprising a differential gearing, an element which actuates said differential gearing and whose movement is limited by the position of the accumulating mechanism, and an element which is actuated by the differential gearing and is connected with and actuates said type carriers.

9. The combination of orders of finger key levers, accumulating mechanism which may be set by said key levers, totalizing mechanism, printing mechanism including type carriers, and means for actuating the accumulating mechanism and the type carriers according to the setting of said key levers, said totalizing mechanism comprising a differential gearing, an element which actuates said differential gearing and whose movement is limited by the position of the accumulating mechanism, an element which is actuated by the differential gearing and is connected with and actuates said type carriers, and a differential actuating yoke extending across the orders of totalizing mechanism and carrying the differential gearings of the various orders.

10. The combination of orders of finger key levers, accumulating mechanism which may be set by said key levers, totalizing mechanism, printing mechanism including type carriers, and means for actuating the accumulating mechanism and the type carriers according to the setting of said key levers, said totalizing mechanism comprising a differential gearing, an element which actuates said differential gearing and whose movement is limited by the position of the accumulating mechanism, an element which is actuated by the differential gearing and is connected with and actuates said type carriers, and a stepped cam having a series of steps for variably limiting the movement of said element which actuates the differential gearing.

11. The combination of finger key levers having rearwardly extending portions formed with cam slots, mechanism which may be set by said key levers, printing mechanism including type carriers, means whereby each type carrier is connected with one of said cam slots, and means for actuating the accumulating mechanism and the type carriers according to the setting of said key levers.

In witness whereof, I have hereunto set my hand in the presence of two subscribing witnesses.

WILLIAM M. HOLLOWAY.

Witnesses:
  JOHN W. MUNDAY,
  J. C. CARPENTER.